US012326674B2

(12) United States Patent
Sekiya

(10) Patent No.: US 12,326,674 B2
(45) Date of Patent: Jun. 10, 2025

(54) DEVELOPING DEVICE AND METHOD OF AGITATING INITIAL DEVELOPER INSIDE DEVELOPING DEVICE

(71) Applicant: CANON KABUSHIKI KAISHA, Tokyo (JP)

(72) Inventor: Koshin Sekiya, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/473,767

(22) Filed: Sep. 25, 2023

(65) Prior Publication Data

US 2024/0103403 A1 Mar. 28, 2024

(30) Foreign Application Priority Data

Sep. 28, 2022 (JP) ................................ 2022-154394

(51) Int. Cl.
*G03G 15/08* (2006.01)
*G03G 21/16* (2006.01)

(52) U.S. Cl.
CPC ..... *G03G 15/0889* (2013.01); *G03G 15/0868* (2013.01); *G03G 15/0872* (2013.01); *G03G 15/0886* (2013.01); *G03G 15/0893* (2013.01); *G03G 21/1676* (2013.01); *G03G 2215/0827* (2013.01)

(58) Field of Classification Search
CPC ........... G03G 15/0868; G03G 15/0872; G03G 15/0886; G03G 15/0889; G03G 15/0893; G03G 21/1676; G03G 2215/0827
See application file for complete search history.

(56) References Cited

U.S. PATENT DOCUMENTS

| | | | | |
|---|---|---|---|---|
| 8,989,633 B2 * | 3/2015 | Nakajima | G03G 15/0886 | 399/258 |
| 2011/0286768 A1 * | 11/2011 | Muto | G03G 15/0822 | 399/258 |
| 2012/0328336 A1 * | 12/2012 | Ota | G03G 21/1857 | 403/376 |

(Continued)

FOREIGN PATENT DOCUMENTS

JP 2019040054 A 3/2019

*Primary Examiner* — Sophia S Chen
(74) *Attorney, Agent, or Firm* — Canon U.S.A., Inc. IP Division

(57) ABSTRACT

A developing device includes a developer carrier, first and second chambers, first and second communication portions, first and second conveyance screws, a pair of sealing members, and a drive transmission gear. The developer carrier carries developer containing toner and carrier for developing an electrostatic image formed on an image carrier. The second chamber is partitioned from the first chamber. The first conveyance screw conveys the developer in a first direction from the first communication portion toward the second communication portion. The second conveyance screw conveys the developer in a second direction from the second communication portion toward the first communication portion. The sealing member pair seals the first and second communication portions to store initial developer in the second chamber. The drive transmission gear includes a fitting portion to which a tool to input a driving force for rotating the second conveyance screw to the drive transmission gear is fitted.

20 Claims, 18 Drawing Sheets

(56) References Cited

U.S. PATENT DOCUMENTS

| | | | | |
|---|---|---|---|---|
| 2016/0085178 | A1* | 3/2016 | Kawasumi | G03G 15/0882 399/106 |
| 2016/0170353 | A1* | 6/2016 | Saito | G03G 15/0893 399/106 |
| 2016/0216639 | A1* | 7/2016 | Nose | G03G 15/0893 |

* cited by examiner

DEVELOPING DEVICE AND METHOD OF AGITATING INITIAL DEVELOPER INSIDE DEVELOPING DEVICE

BACKGROUND

Field

The present disclosure relates to a developing device for developing an electrostatic image formed on an image carrier with developer containing toner and carrier, and to a method of agitating initial developer inside the developing device.

Description of the Related Art

In a developing device discussed in Japanese Patent Application Laid-Open No. 2019-040054, a developer supply opening provided in a developer storage portion is sealed by a sealing member, and a winding shaft that is rotatable to wind up the sealing member and a developer agitation member are coupled through a driving system inside the developing device. In a configuration discussed in Japanese Patent Application Laid-Open No. 2019-040054, before the developing device is used, the sealing member can be manually removed by directly rotating the winding shaft with use of a tool in a state where a gear at an end part of the winding shaft is separated from the driving system inside the developing device.

There exists conventional developing devices having a sealed developer storage chamber in which developer inside the sealed developer storage chamber may be in a compaction state. Depending on transportation and a storage state of the conventional developing device before a sealing member is unsealed (at shipment), the developer may be in a tapping state where the developer is compressed on a downstream side in a conveyance/agitation screw conveyance direction before the developing device is used. In a case where initial startup (initialization operation for development driving) of the developing device is performed while the developing device is in the tapping state, load torque of a motor for rotating a screw conveying and agitating the developer is increased. If the load torque of the motor becomes a predetermined value or more, screw locking may occur to inhibit rotation of the screw in such conventional developing devices.

SUMMARY

The present disclosure is directed to a technique for eliminating a tapping state of a developing device before a sealing member is unsealed (at shipment), with a simple configuration.

According to an aspect of the present disclosure, a developing device includes a developer carrier configured to carry developer containing toner and carrier for developing an electrostatic image formed on an image carrier, a first chamber configured to supply the developer to the developer carrier, a second chamber partitioned from the first chamber by a partition and configured to allow circulation of the developer between the second chamber and the first chamber, a first communication portion configured to permit the developer to communicate from the second chamber to the first chamber, a second communication portion configured to permit the developer to communicate from the first chamber to the second chamber, a first conveyance screw disposed in the first chamber and configured to convey the developer in a first direction from the first communication portion toward the second communication portion, a second conveyance screw disposed in the second chamber and configured to convey the developer in a second direction from the second communication portion toward the first communication portion, a pair of sealing members configured to seal the first communication portion and the second communication portion to store initial developer in the second chamber, and a drive transmission gear configured to transmit driving force for rotating the second conveyance screw to the second conveyance screw, wherein the drive transmission gear includes a fitting portion to which a tool to input the driving force for rotating the second conveyance screw to the drive transmission gear is fitted.

According to another aspect of the present disclosure, a method of agitating initial developer inside a developing device, the developing device including a developer carrier configured to carry developer containing toner and carrier for developing an electrostatic image formed on an image carrier, a first chamber configured to supply the developer to the developer carrier, a second chamber partitioned from the first chamber by a partition and configured to allow circulation of the developer between the second chamber and the first chamber, a first communication portion configured to permit the developer to communicate from the second chamber to the first chamber, a second communication portion configured to permit the developer to communicate from the first chamber to the second chamber, a first conveyance screw disposed in the first chamber and configured to convey the developer in a first direction from the first communication portion toward the second communication portion, a second conveyance screw disposed in the second chamber and configured to convey the developer in a second direction from the second communication portion toward the first communication portion, a pair of sealing members configured to seal the first communication portion and the second communication portion to store initial developer in the second chamber, and a drive transmission gear configured to transmit driving force for rotating the second conveyance screw to the second conveyance screw, includes inputting the driving force for rotating the second conveyance screw to the drive transmission gear by using a tool in a state where the first communication portion and the second communication portion are sealed by the pair of sealing members, and agitating the initial developer by rotation of the second conveyance screw by inputting the driving force for rotating the second conveyance screw to the drive transmission gear.

Further features of the present disclosure will become apparent from the following description of exemplary embodiments with reference to the attached drawings.

DESCRIPTION OF THE EMBODIMENTS

Some exemplary embodiments of the present disclosure are to be described in detail with reference to accompanying drawings. The present disclosure according to the claims is not limited to the exemplary embodiments, and all of combinations of features to be described in the exemplary embodiments are not necessarily essential for the present disclosure. The present disclosure can be implemented in various applications such as a printer, various kinds of printing machines, a copier, a facsimile (FAX), and a multifunctional peripheral.

Configuration of Image Forming Apparatus

Figure 1:
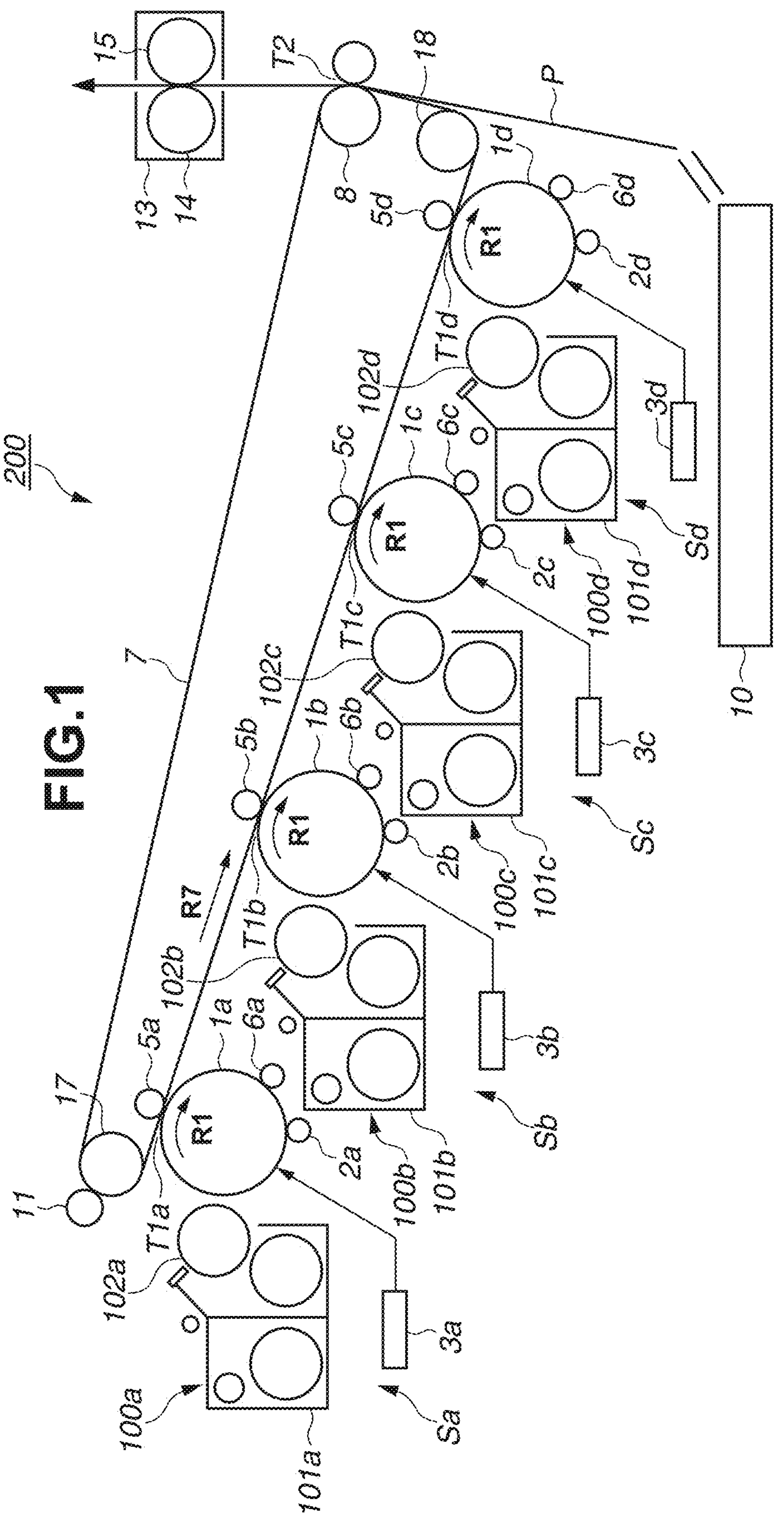
FIG. 1 is a diagram illustrating a configuration of an image forming apparatus.

A first exemplary embodiment is to be described. FIG. 1 is a diagram illustrating a configuration of an image forming apparatus. As illustrated in FIG. 1, an image forming apparatus 200 is a tandem intermediate transfer full-color printer in which image forming units Sa, Sb, Sc, and Sd for yellow, magenta, cyan, and black, respectively, are exchangeably mounted and arrayed along an intermediate transfer belt 7.

In the image forming unit Sa, a yellow toner image is formed on a photosensitive drum 1*a* (image carrier), and is transferred to the intermediate transfer belt 7. In the image forming unit Sb, a magenta toner image is formed on a photosensitive drum 1*b*, and is transferred to the intermediate transfer belt 7. In the image forming units Sc and Sd, a cyan toner image and a black toner image are formed on photosensitive drums 1*c* and 1*d*, respectively, and are transferred to the intermediate transfer belt 7.

The intermediate transfer belt 7 is stretched on primary transfer rollers 5*a*, 5*b*, 5*c*, and 5*d*, a counter roller 8, a tension roller 17, and a stretching roller 18, and is driven by the counter roller 8 that also functions as a driving roller, thereby is rotated in a direction of an arrow R7. The toner images of four colors having been transferred to the intermediate transfer belt 7 are conveyed to a secondary transfer portion T2, and are secondarily transferred to a recording medium P that has been taken out from a recording medium cassette 10 and has been conveyed to the secondary transfer portion T2. The recording medium P is supplied to the secondary transfer portion T2 by a feeding conveyance device including a sheet feeding roller, a conveyance roller, and a registration roller (not illustrated).

The recording medium P to which the toner images have been transferred at the secondary transfer portion T2 is heated and pressurized by a fixing device 13 in which a pressurizing roller 15 is pressed to a fixing roller 14. After the toner images are fixed to a front surface of the recording medium P, the recording medium P is discharged out of the apparatus.

The image forming units Sa, Sb, Sc, and Sd have substantially the same configuration except that toner colors used in developing devices 100*a*, 100*b*, 100*c*, and 100*d* are different from one another. In the following, the image forming unit Sa is to be described, and the image forming units Sb, Sc, and Sd are to be described by replacing a suffix "a" attached to reference numerals of components of the image forming unit Sa with "b", "c", and "d".

The image forming unit Sa includes a charging roller 2*a*, an exposure device 3*a*, the developing device 100*a*, the primary transfer roller 5*a*, and an auxiliary charging roller 6*a* that are arranged around the photosensitive drum 1*a*.

The photosensitive drum 1*a* includes a negatively-charged photosensitive layer on an outer peripheral surface of an aluminum cylinder, and rotates at a predetermined process speed in a direction of an arrow R1. The charging roller 2*a* uniformly charges a surface of the photosensitive drum 1*a* to a negative potential. The exposure device 3*a* performs scanning with a laser beam by using a rotary mirror, thereby writing an electrostatic image of an image on the charged surface of the photosensitive drum 1*a*. The developing device 100*a* develops the electrostatic image formed on the photosensitive drum 1*a* by using two-component developer containing toner and carrier, thereby forming the toner image on the photosensitive drum 1*a*.

The primary transfer roller 5*a* presses an inside surface of the intermediate transfer belt 7 to form a primary transfer portion T1*a* between the photosensitive drum 1*a* and the intermediate transfer belt 7. When a positive direct-current voltage is applied to the primary transfer roller 5*a*, the negative toner image carried by the photosensitive drum 1*a* is primarily transferred to the intermediate transfer belt 7. The auxiliary charging roller 6*a* negatively charges transfer residual toner that escapes from being transferred to the recording medium P and remains on the photosensitive drum 1*a*, and involves resultant toner in next development by the developing device 100*a*.

A belt cleaner 11 is in contact with the intermediate transfer belt 7 at a position corresponding to the tension roller 17 so that the transfer residual toner attached to the intermediate transfer belt 7 is removed.

Configuration of Developing Device

Figure 2:
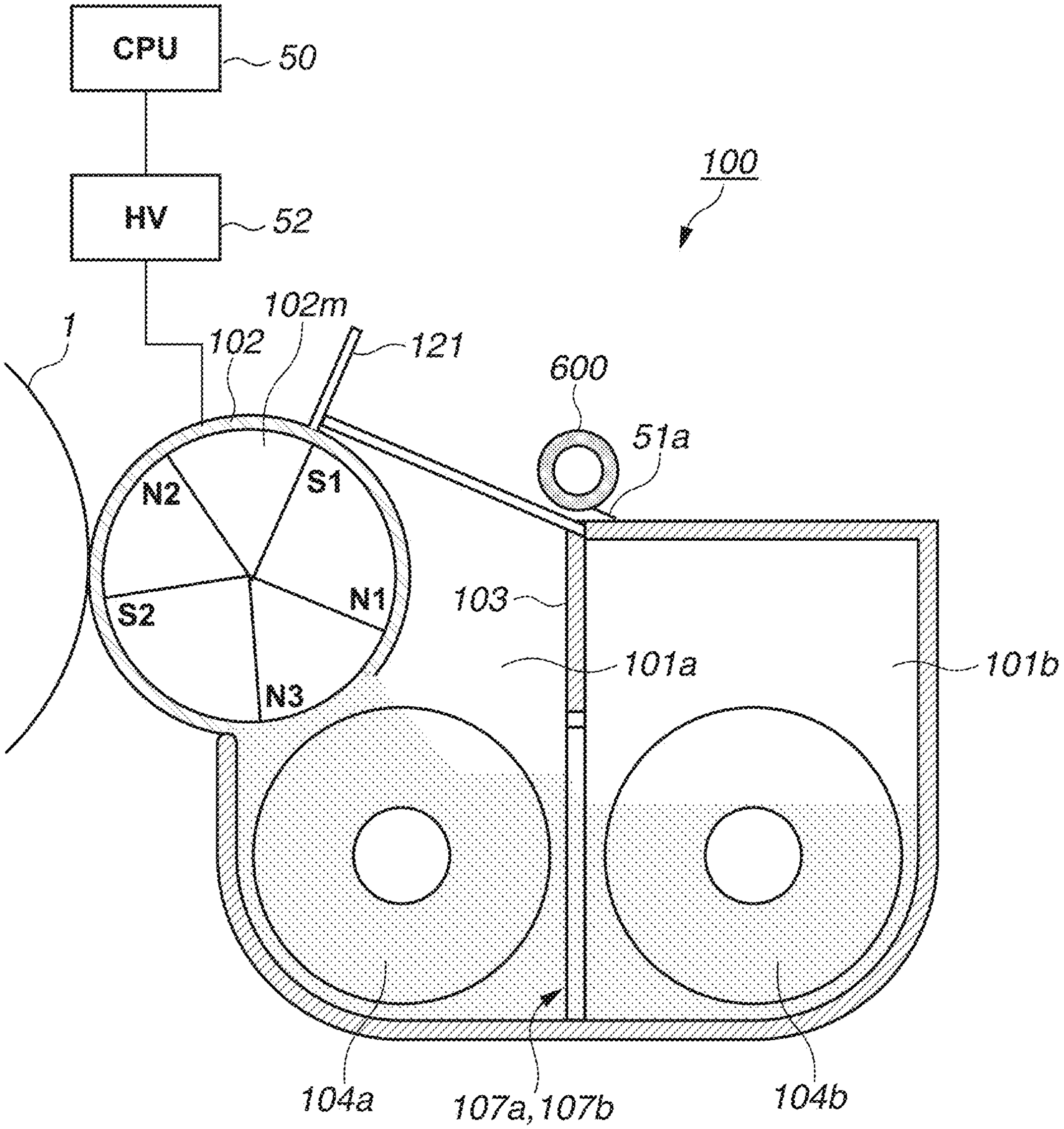
FIG. 2 is a diagram illustrating a cross-sectional configuration of a developing device.
Figure 3:
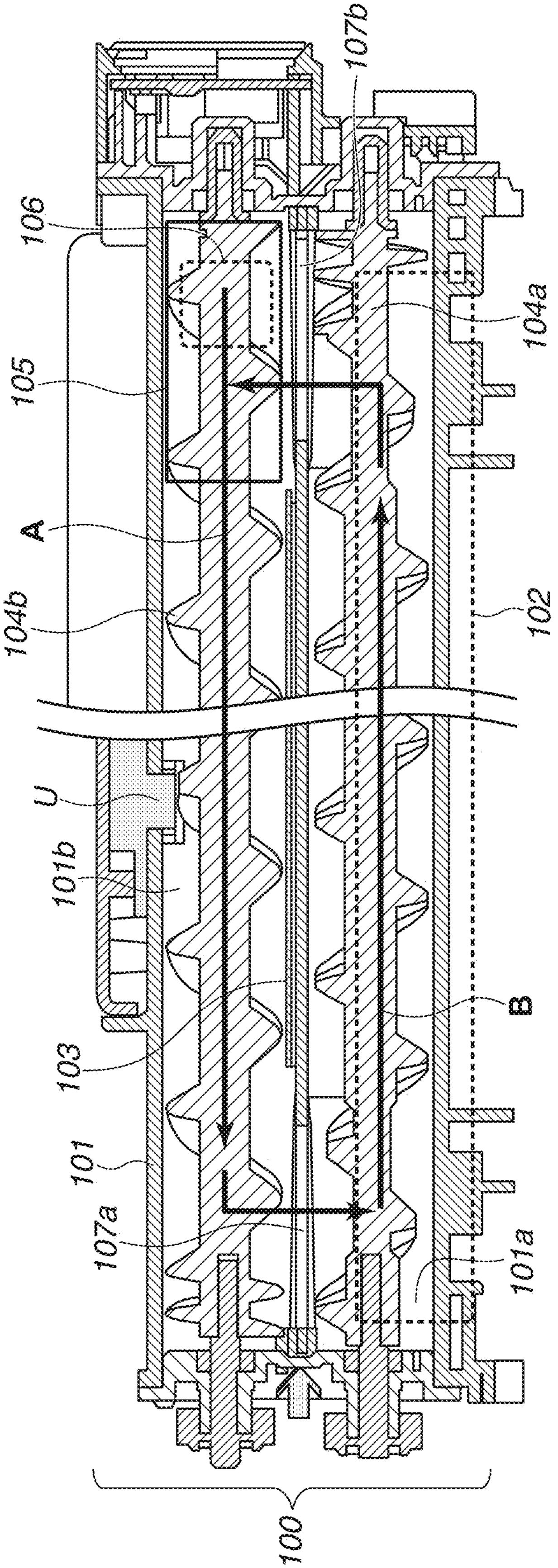
FIG. 3 is a cross-sectional view illustrating a plane configuration of the developing device.

FIG. 2 is a diagram illustrating a cross-sectional configuration of the developing device. FIG. 3 is a diagram illustrating a plane configuration of the developing device. In the following, the developing device exchangeably mounted on the image forming unit is to be described while the suffixes "a", "b", "c", and "d" of the reference numerals attached to distinguish the image forming units are omitted. The developing device 100 is mountable on a mounting unit for mounting the developing device.

As illustrated in FIG. 2, the developing device 100 develops an electrostatic image (latent image) on the photosensitive drum 1 by causing a development sleeve 102 as an example of a developer carrier to carry the developer containing the toner and the carrier. The development sleeve 102 is rotatably disposed at an opening of a developer container 101 facing the photosensitive drum 1. A thickness regulation blade 121 is disposed on an upstream side of a developing area where the development sleeve 102 and the photosensitive drum 1 face each other in a rotation direction, and regulates a thickness of the developer carried by the development sleeve 102.

An inside of the developer container 101 is partitioned into a development chamber 101*a* and an agitation chamber 101*b* by a vertically-provided partition 103. The two-component developer in which non-magnetic toner, magnetic carrier, and a small amount of external additive are mixed is stored in the development chamber 101*a* and in the agitation chamber 101*b* (circulation path).

A magnet 102*m* that includes a plurality of magnetic poles on a surface of the magnet 102*m* and is unrotatably supported is disposed inside the development sleeve 102. The developer is carried on the surface of the development sleeve 102 in a state where the carrier as a magnetic material is constrained by a magnetic flux formed between adjacent magnetic poles of the magnet 102*m*, and the negatively-charged toner is electrostatically constrained on the surface of the positively-charged carrier to form a magnetic brush. A power supply 52 applies an oscillation voltage in which an alternating-current voltage is superimposed on a negative direct-current voltage, to move the negatively-charged toner carried by the magnetic brush to the electrostatic image of the photosensitive drum 1.

As illustrated in FIG. 3, the inside of the developer container 101 is partitioned into two parallel spaces by the partition 103. Each of the agitation chamber 101*b* and the development chamber 101*a* is configured to store and convey the two-component developer. The developing device 100 includes the agitation chamber 101*b* internally including an agitation screw 104*b* (second conveyance member), the development chamber 101*a* internally including a development screw 104*a* (first conveyance member), and the development sleeve 102 disposed near an upper portion of the development chamber 101*a*.

The agitation chamber 101*b* and the development chamber 101*a* communicate with each other through openings 107*a* and 107*b* provided at respective end parts of the partition 103, thereby forming the circulation path of the developer. The developer is delivered from the agitation chamber 101*b* (second chamber) to the development chamber 101*a* (first chamber) through the opening 107*a* (first communication portion). On the other hand, the developer is delivered from the development chamber 101*a* (first chamber) to the agitation chamber 101*b* (second chamber) through the opening 107*b* (second communication portion). In other words, the opening 107*a* (first communication portion) permits the developer to communicate from the agitation chamber 101*b* (second chamber) to the development chamber 101*a* (first chamber). The opening 107*b* (second communication portion) permits the developer to communicate from the development chamber 101*a* (first chamber) to the agitation chamber 101*b* (second chamber).

In a process in which the developer circulates along the circulation path thus configured while being agitated, friction occurs between toner particles and carrier particles. As a result, the toner is negatively charged and the carrier is positively charged. After the developer is conveyed to a downstream side while being agitated by the agitation screw 104*b* inside the agitation chamber 101*b*, the developer flows into the development chamber 101*a* through the opening 107*a* of the partition 103. The developer is carried by the development sleeve 102 in a process of being conveyed to the downstream side by the development screw 104*a* inside the development chamber 101*a*.

The development screw 104*a* as an example of a first conveyance screw is rotatably attached in the development chamber 101*a* as an example of the first chamber. When the development screw 104*a* rotates, the two-component developer is conveyed from the upstream side toward the downstream side in the development chamber 101*a* as illustrated by an arrow B.

The agitation screw 104*b* as an example of a second conveyance screw is rotatably attached in the agitation chamber 101*b* as an example of the second chamber. When the agitation screw 104*b* rotates, the two-component developer is conveyed from the upstream side toward the downstream side in the agitation chamber 101*b* as illustrated by an arrow A.

A toner replenishing mechanism 105 is disposed above an upstream end of the agitation chamber 101*b*. The toner stored in a toner bottle (not illustrated) is conveyed to the toner replenishing mechanism 105 through a toner conveyance path (not illustrated), and is dropped and replenished into the agitation chamber 101*b* through a toner replenishing port 106. In the developing device 100, toner of the same type as the initial developer is used as replenishment toner.

A toner charge amount Q/M of the two-component developer is an important parameter for determining a density of a developed image. A weight ratio of the toner (toner density T/D) contained in the two-component developer and the toner charge amount Q/M have correlation.

The toner is charged by contact friction with the carrier. For this reason, the toner charge amount Q/M is increased as contact frequency of the toner with the carrier is increased. Thus, the toner charge amount Q/M of the two-component developer is increased as the toner density T/D is decreased, and the image density when an equivalent electrostatic image is developed is lowered. Accordingly, the toner density T/D of the developer circulating between the development chamber 101*a* and the agitation chamber 101*b* is constantly detected by a magnetic permeability sensor U. The toner amount replenished from the toner replenishing mechanism 105 is adjusted so that the toner density T/D becomes substantially constant.

Sealing Structure of Initial Developer

Figure 4:
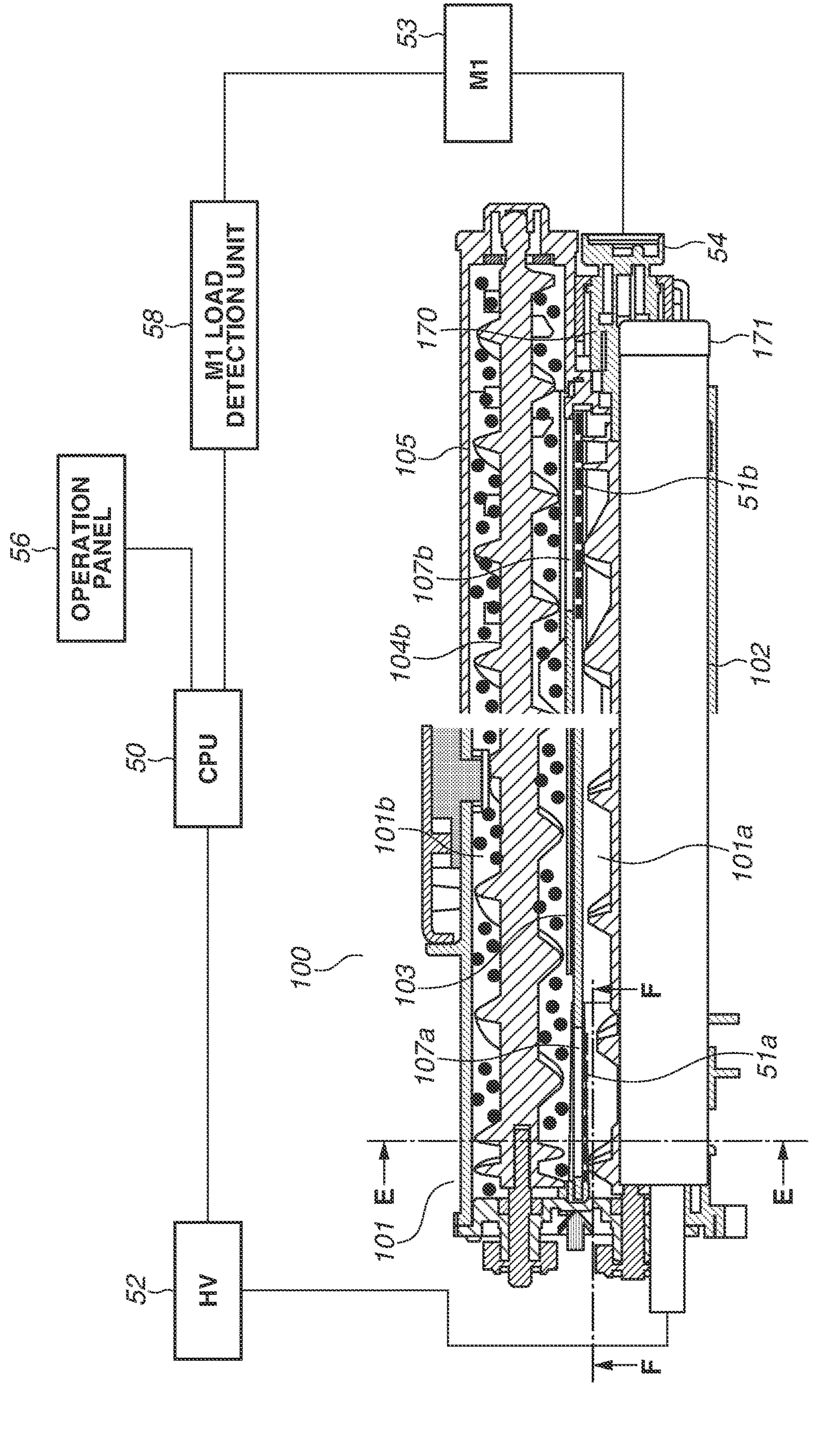
FIG. 4 is a diagram illustrating the plane configuration of the developing device and operation of the developing device.
Figure 5:
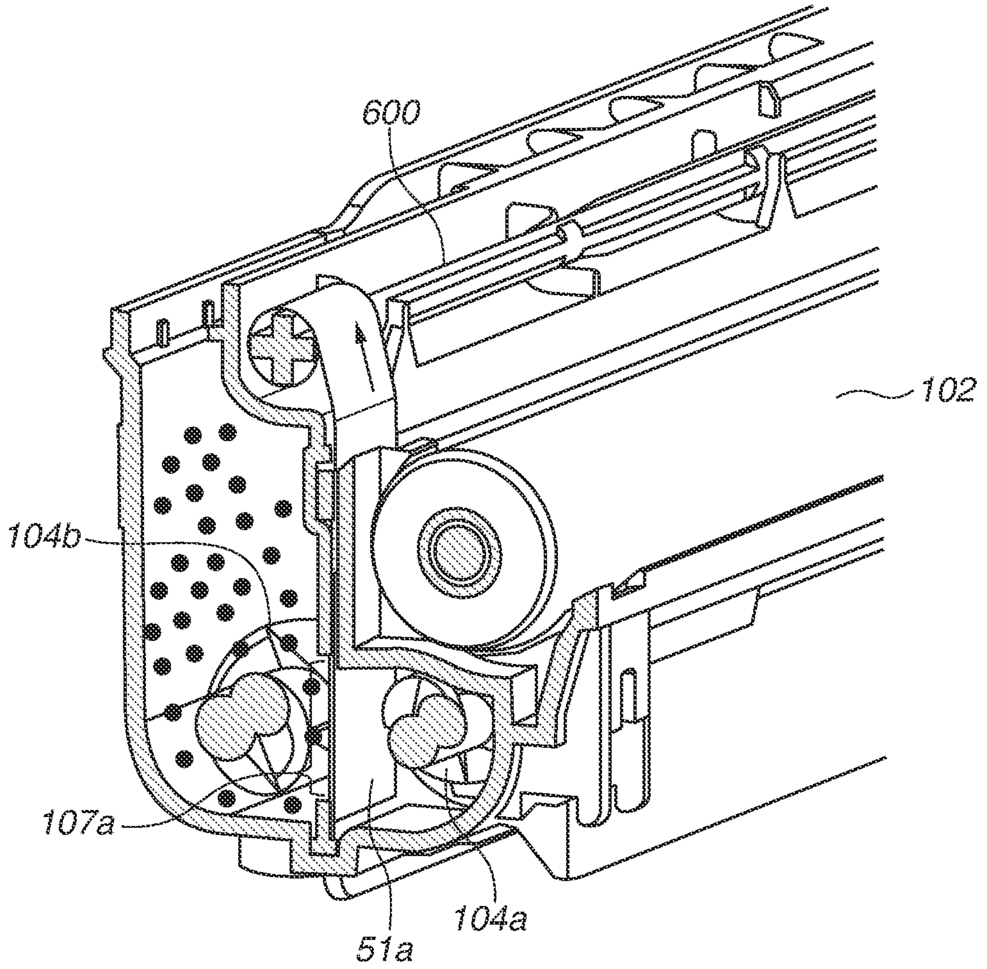
FIG. 5 is a cross-sectional view illustrating a sealing structure of initial developer of the developing device.

FIG. 4 is a diagram illustrating the plane configuration of the developing device as viewed from above. FIG. 5 is a diagram illustrating a sealing structure of the initial developer of the developing device. FIG. 5 illustrates a vertical cross-section as viewed from direction E-E in FIG. 4.

As illustrated in FIG. 4, relationship of the developing device 100, a driving motor 53, the power supply 52, a control unit 50, an operation panel 56, and a load detection unit 58 for the driving motor 53 is illustrated in a block diagram. In the developing device 100, a sealing sheet 51*a* as an example of a sealing member is stuck to the opening 107*a* of the partition 103 partitioning the inside of the developer container 101, and a sealing sheet 51*b* as an example of the sealing member is stuck to the opening 107*b*. With such a configuration, only the agitation chamber 101*b* is filled with the initial developer in a sealed state, in the developing device 100 at shipment. At this time, the carrier and the toner of the developer are absent in the development chamber 101*a*. In other words, the sealing sheet 51*a* and the sealing sheet 51*b* function as paired sealing members that seal the opening 107*a* (first communication portion) and the opening 107*b* (second communication portion), respectively, to store the initial developer in the agitation chamber 101*b*.

As illustrated in FIG. 5, the sealing sheet 51*a* as an example of the sealing member is a sheet member detachably (unsealably) stuck to the opening 107*a*. The sealing sheet 51*a* is stuck to the opening 107*a* on the downstream side in a conveyance direction by the second conveyance screw.

The sealing sheet 51*a* is folded upward from a lower end side while sealing the opening 107*a*, and a front end of the sealing sheet 51*a* is fixed to a winding shaft 600. The sealing sheet 5 1*b* on an opposite side is similarly folded upward from a lower end side while sealing the opening 107*b*, and a front end of the sealing sheet 51*b* is fixed to the common winding shaft 600.

The winding shaft 600 as a sealing sheet unsealing mechanism is coupled to the development sleeve 102 by a gear train so as to receive rotation. Accordingly, along with rotation of the development sleeve 102, the sealing sheets 51*a* and 51*b* are wound around the winding shaft 600 to open the openings 107*a* and 107*b*, respectively.

The winding shaft 600 automatically tears off the sealing sheets 51*a* and 51*b* of the developing device 100 from the openings 107*a* and 107*b* without relying on a work by a user. The developing device 100 is started up to a usable state (initialization operation of developing device is completed) by circulating and spreading the developer inside the development chamber 101*a* and the agitation chamber 101*b*.

Unsealing Driving Mechanism

Figure 6A:
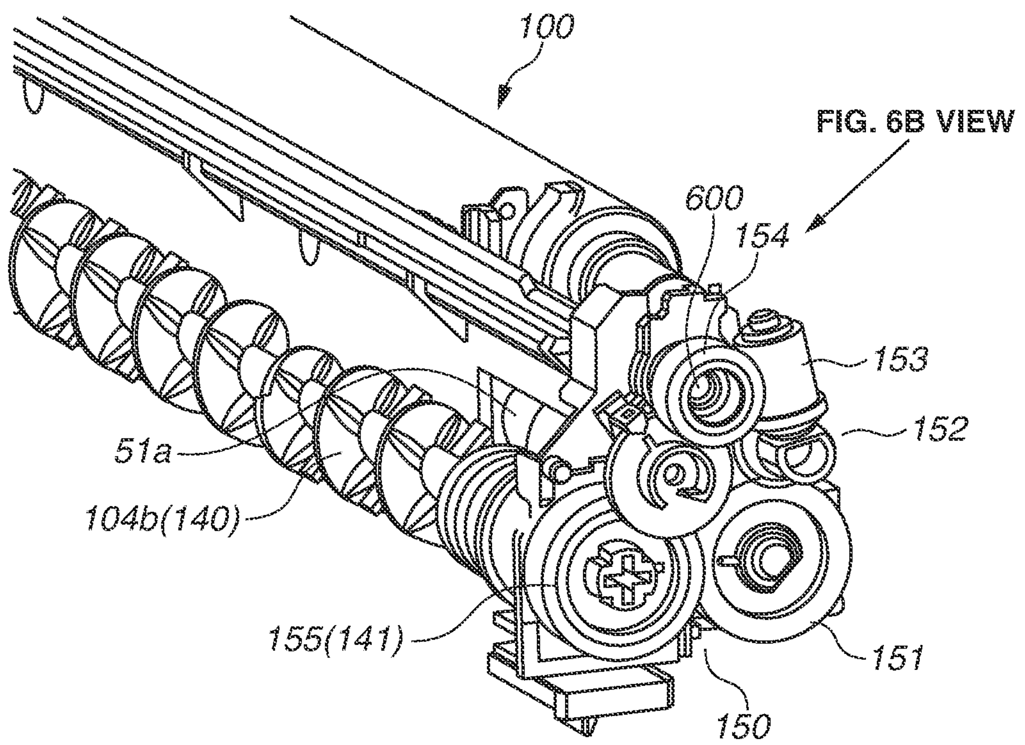
FIGS. 6A and 6B are diagrams illustrating a configuration of a driving gear train of the developing device.
Figure 6B:
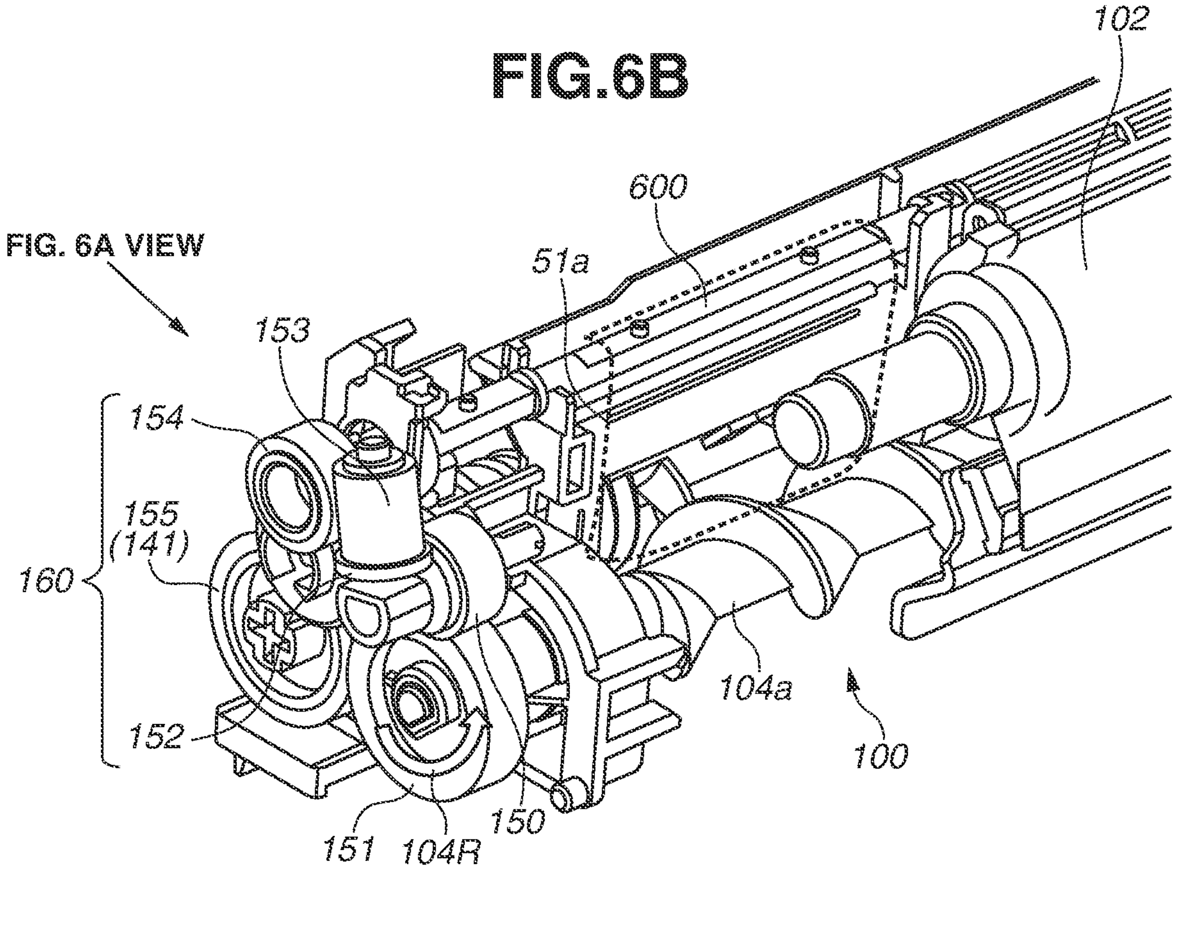

FIGS. 6A and 6B are diagrams illustrating a driving gear train of the developing device 100, and are perspective views illustrating the same portion from different directions. As illustrated in FIGS. 6A and 6B with reference to FIG. 4, in the developing device 100, the development screw 104*a* is connected to the driving motor 53 installed on the main body (apparatus main body) of the image forming apparatus 200 through a coupling 54 (see FIG. 4) that is detachable in an axis direction. The driving motor 53 rotationally drives the development screw 104*a* under the control of the control unit (central processing unit (CPU)) 50. Rotation is transmitted to the development sleeve 102 by a gear 170 (see FIG. 4) provided on a shaft of the development screw 104*a*, a sleeve gear 171 (see FIG. 4) provided on a shaft of the development sleeve, and an intermediate gear (not illustrated).

Rotation of the development screw 104*a* is transmitted by a gear train 160 on a side opposite to the side connected to the coupling 54, to integrally rotate the agitation screw 104*b*, the development screw 104*a*, and the winding shaft 600. The development sleeve 102, the development screw 104*a*, the agitation screw 104*b*, and the winding shaft 600 form one system of gear train by a gear train 160. When the development screw 104*a* rotates, an output gear 151 at an end part rotates. An idler gear 150 engaging with the output gear 151 rotates the winding shaft 600 through engagement of the gear 153 and the gear 154 coupled to the winding shaft 600. To secure torque necessary for the winding shaft 600 to tear off the sealing sheet 51*a*, the gears 153 and 154 are configured to be largely decelerated using a worm gear and a worm wheel.

On the other hand, an agitation screw gear 155 rotating the agitation screw 104*b* engages with the output gear 151.

These driving gear trains are formed by coupling in the same series, and all of the gears are rotationally driven when the coupling 54 rotates. The same series of gear trains indicates a drive transmission path in which a driving force is transmitted to each of the coupling 54 and the agitation screw 104*b*, the coupling 54 and the winding shaft 600, and the sheeve gear 171. A gear train branched from the gears in series is considered to be identical to a branching gear, and the gear trains directly engaging with one another are regarded as the same series irrespective of a gear train length after branching and the number of branches.

Figure 7:
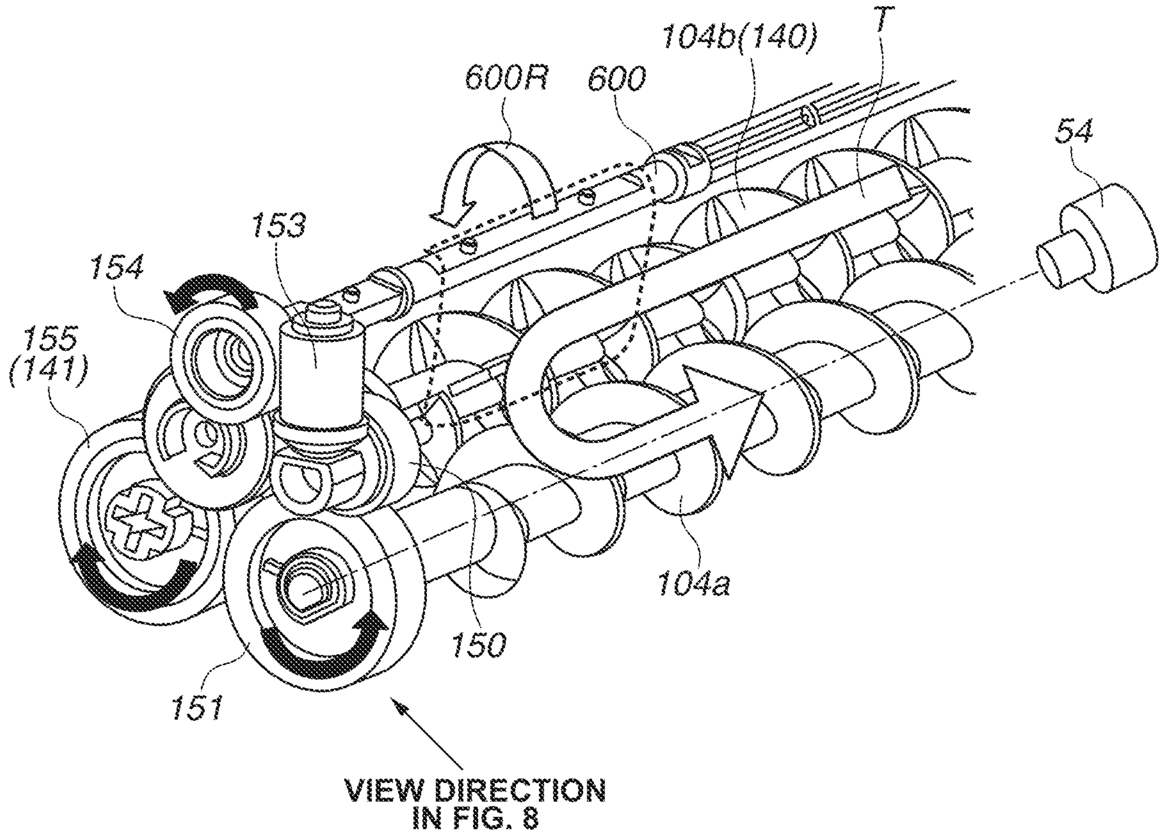
FIG. 7 is a diagram illustrating operation of a driving mechanism of the developing device.
Figure 8:
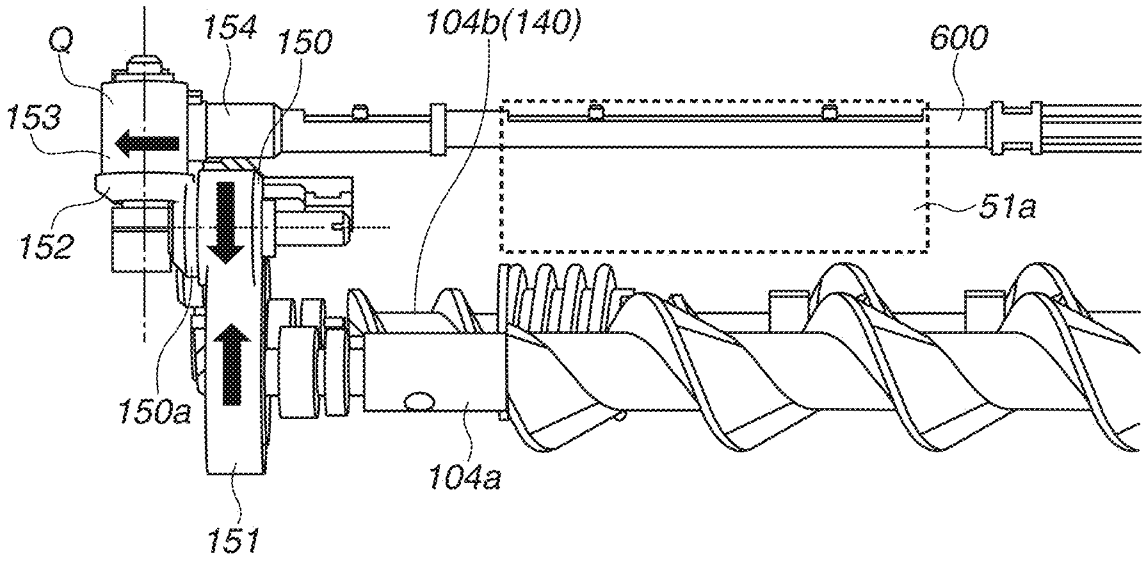
FIG. 8 is a perspective view illustrating the operation of the driving mechanism of the developing device.

Description of Operation during Initialization Operation for Development Driving Operation of a driving mechanism of the developing device 100 is to be described with reference to FIG. 7 and FIG. 8. FIG. 8 is a cross-sectional view taken along line F-F in FIG. 4, and illustrates operation of a sealing sheet winding portion during initialization operation of the developing device 100. In FIG. 6A to FIG. 8, illustration of the developer container 101 is omitted to facilitate understanding of an internal structure of the developer container 101.

The developing device 100 is mounted on the image forming apparatus 200, or the developing device 100 is previously mounted inside the image forming apparatus 200 at shipment. Power is supplied to the driving motor 53 of a driving source M1 provided in the image forming apparatus 200 from a power supply of the image forming apparatus 200. Rotational driving force is transmitted to the development screw 104*a* through the coupling 54 attached to a shaft end part of the development screw 104*a* of the developing device 100. In normal rotation, the development screw 104*a* is rotated in a direction of an arrow 104R illustrated in FIG. 6B. The output gear 151 provided at a shaft end part of the development screw 104*a* on a side opposite to the side provided with the coupling 54 rotates, and the rotation is transmitted to the idler gear 150 engaging with the output gear 151. The output gear 151 also engages with the agitation screw gear 155, and rotational force is transmitted to the agitation screw 104*b*.

A bevel gear 150*a* is integrally provided at one end side of the idler gear 150 engaging with the output gear 151. A bevel gear 152 is integrally provided at one end side of the worm gear 153. The bevel gears 152 and 150*a* are disposed such that rotary axes thereof form 90 degrees, and engage with each other. As a result, the rotational force transmitted to the idler gear 150 is transmitted to the worm gear 153 through engagement of the bevel gears 152 and 150*a*. The worm wheel largely decelerated by the worm gear 153 and the worm wheel 154 rotates in an arrow direction. At this time, the worm gear 153 itself is urged in a direction of an arrow Q illustrated in FIG. 8 by receiving reaction force from the worm wheel 154. Accordingly, engagement of the bevel gear 152 and the bevel gear 150*a* provided on the idler gear 150 is maintained.

The worm wheel 154 is coupled to the winding shaft 600 for the sealing sheet 51*a* so as to integrally rotate, and the winding shaft 600 rotates integrally with the worm wheel 154 in a direction of an arrow 600R in FIG. 7. On the other hand, the agitation screw gear 155 starts to rotate in the arrow direction by the rotational driving force transmitted from the idler gear 150. As described above, the winding shaft 600 and the agitation screw 104*b* operate at the same time, and unsealing of the sealing member 51 and supply of the developer into the development chamber 101*a* are performed at the same time.

However, the developer inside the agitation chamber 101*b* may be in a compaction state (tapping state) where the developer is compressed on a downstream side in the conveyance direction by the agitation screw 104*b* before the developing device 100 is used, due to influence of logistics, storage, and the like of the developing device 100 before the sealing sheet 51*a* is unsealed (at shipment).

In a case where the developer inside the agitation chamber 101*b* is in the compaction state, resistance of the developer in the compaction state is applied at driving of the agitation screw 104*b*. In a case where initial startup (initialization operation for development driving) of the developing device 100 is performed while the developing device 100 is in the tapping state, load torque of the driving motor 53 for rotating the agitation screw 104*b* is increased. If the load toque of the driving motor 53 becomes a predetermined value or more, screw locking may occur to inhibit rotation of the agitation screw 104*b*.

The load detection unit 58 that detects a current amount of the driving motor 53 to estimate the torque is installed, and driving of the driving motor 53 is stopped when an overload occurs. In particular, in a case where the agitation screw 104*b* is driven before the sealing member 51 is unsealed as with the present configuration, the developer cannot move in a direction T illustrated in FIG. 7, and the load of the developer inside the agitation chamber 101*b* is continuously increased. As a result, the driving motor 53 is stopped by the load detection unit 58.

Figure 9:
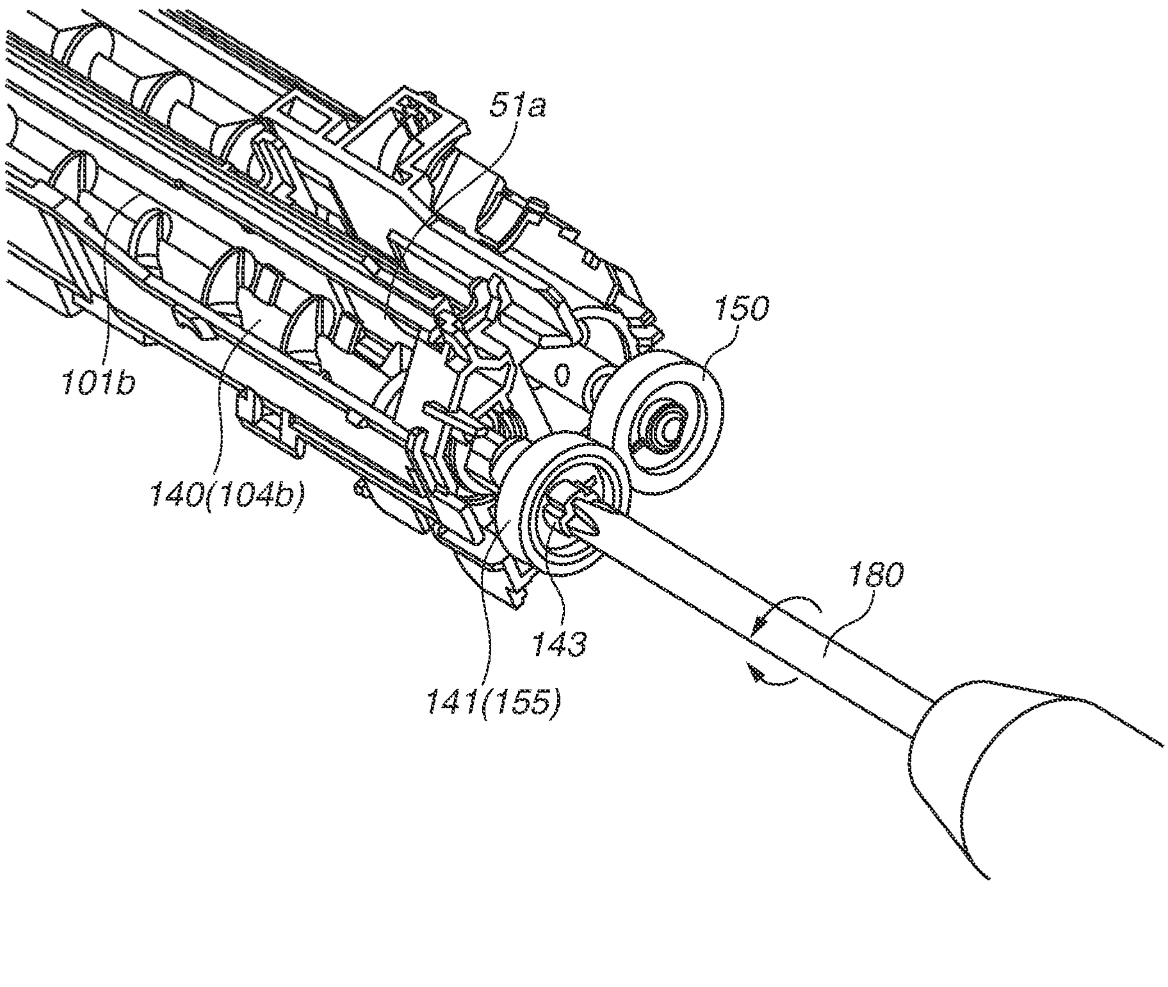
FIG. 9 is a diagram illustrating loosening operation of the developing device according to a first exemplary embodiment.

Description of Loosening Operation Before Initialization Operation for Development Driving A configuration for loosening operation before initialization operation for driving (development driving) of the developing device 100 according to a first exemplary embodiment is to be described with reference to FIG. 9 and FIG. 10. FIG. 9 is a diagram illustrating the configuration for the loosening operation.

Figure 10:
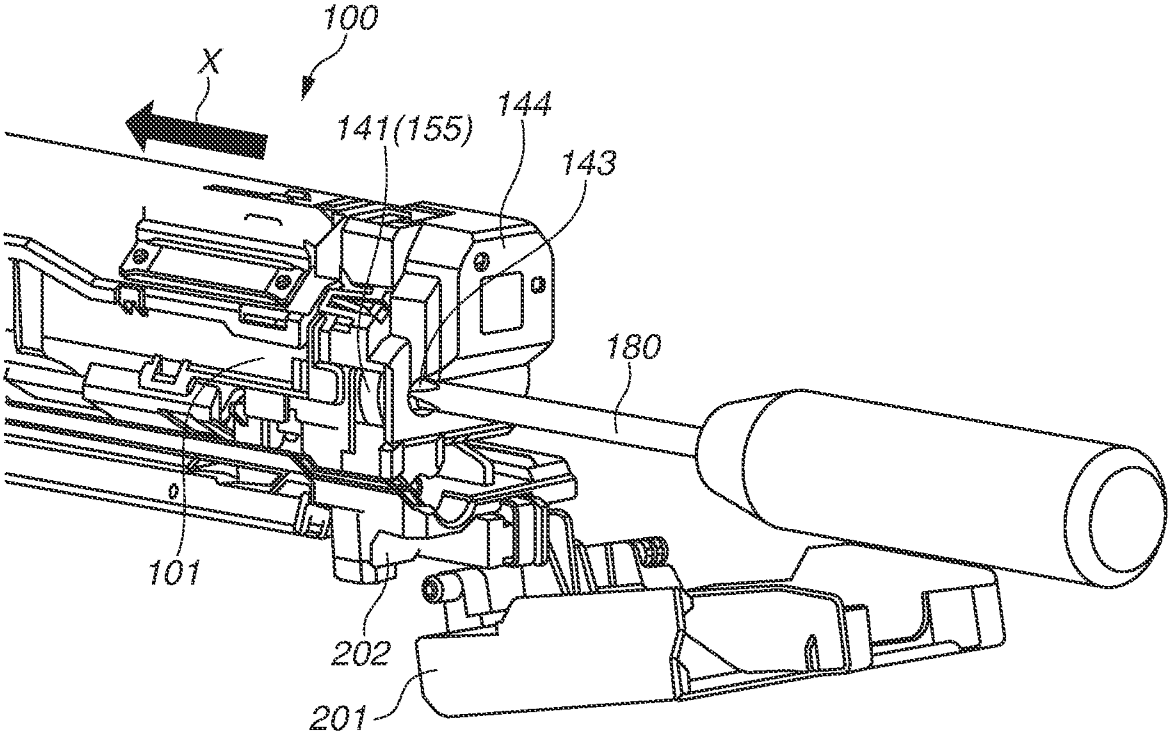
FIG. 10 is a diagram illustrating the loosening operation of the developing device according to the first exemplary embodiment (in state where developing device is mounted on image forming apparatus).

FIG. 10 is a diagram illustrating the loosening operation in a state where the developing device 100 is mounted on the image forming apparatus 200. It is necessary to perform the loosening operation before the initial operation, in order to prevent occurrence of an overload during the initial operation caused by the compaction state of the developer after shipment. A single body state of the developing device 100 and a packed state where the developing device 100 is mounted on the main body of the image forming apparatus 200 are considered as the shipment state of the developing device 100. The loosening operation is preferably performable in the state where the developing device 100 is mounted on the image forming apparatus 200, in order to perform a work common to both states of the developing device 100.

In the first exemplary embodiment, a loosening member 140 for loosening the developer is the agitation screw 104*b*, and a drive input member 141 for driving the loosening member 140 is the agitation screw gear 155.

The drive input member 141 includes an operation portion 143 for receiving drive from outside. In the first exemplary embodiment, the operation portion 143 is a cross slot provided at an end part of the drive input member 141, and can be driven from outside by a tool 180 (general-purpose tool) fitted to the cross slot, such as a screwdriver having a cross-recess, cross-head, or cross-point. The tool may be a Phillips-head screwdriver.

The loosening member 140, namely, the agitation screw 104*b* is driven by drive by the tool 180 through the drive input member 141. This makes it possible to loosen the developer in the agitation chamber 101*b* sealed by the sealing member 51. Examples of the loosening operation of the developing device 100 include a method in which normal rotation and reverse rotation are repeated a plurality of times. As a result, a worker can eliminate the tapping state of the developing device 100 even in the state where the developing device 100 is mounted on the image forming apparatus 200.

The loosening operation of the developing device 100 in the state where the developing device 100 is mounted on the image forming apparatus 200 is to be described. The developing device 100 is mounted on the image forming apparatus 200 in such a manner that a small door 201 inside the image forming apparatus 200 is opened, and the developing device 100 is inserted along a tray 202 in a direction of a rotation axis direction X of the development sleeve 102. Accordingly, the operation portion 143 for receiving external force for the loosening operation of the developing device 100 is required to be positioned at the end part on a front side from which the developing device 100 is inserted in the rotation axis direction X. In a case where the gears (drive transmission members) are provided at the end part of the developing device 100 as in the first exemplary embodiment, it is necessary to provide a cover 144 (developing device cover) at the end part of the developing device 100 in order to protect the worker (service engineer and user). For this reason, to drive the loosening member 140 from outside, a hole (opening) for driving the drive input member 141 is provided on a surface of the cover 144 facing the drive input member 141. Because the opening is provided in the cover 144, the worker can access the operation portion 143 to manually rotate the loosening member 140 in the state where the developing device 100 is mounted on the image forming apparatus 200.

Figure 11:
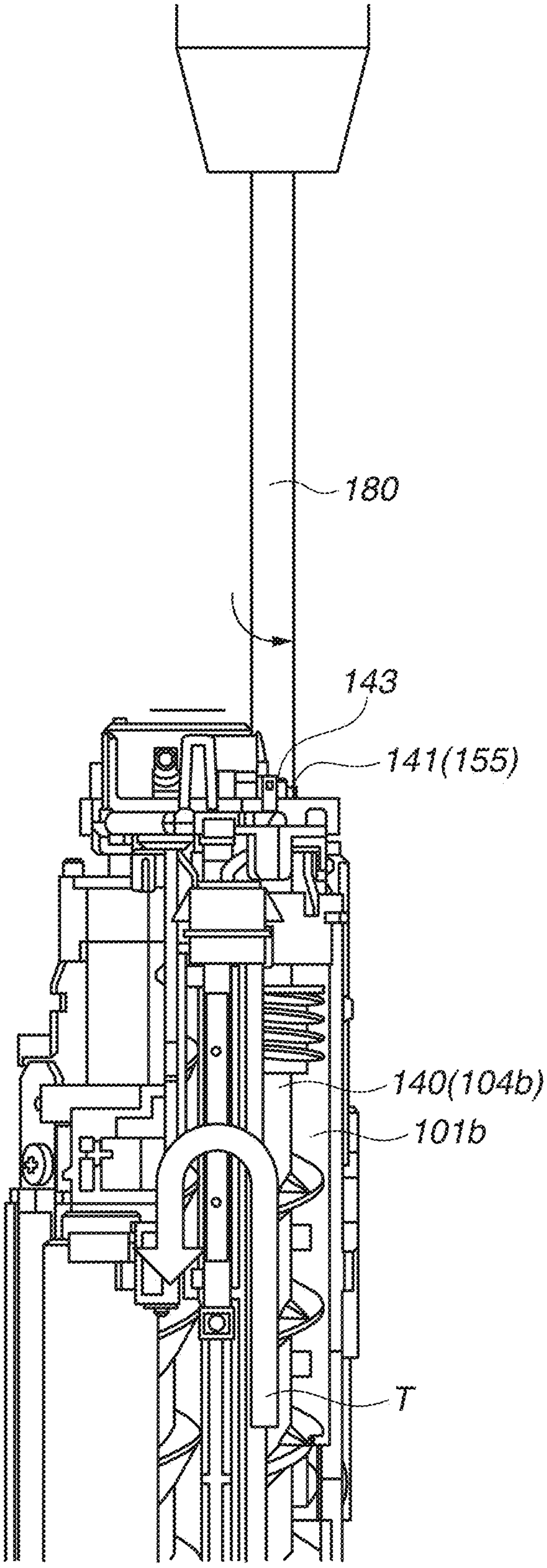
FIG. 11 is a diagram illustrating the loosening operation from outside of a main body of the image forming apparatus according to the first exemplary embodiment.

FIG. 11 illustrates the loosening operation from outside of the main body of the image forming apparatus 200, namely, the loosening operation when the developing device 100 is to be replaced with a new one. This configuration enables execution of the loosening operation after the developing device 100 is mounted on the image forming apparatus 200. In contrast, in a case where the developing device 100 is placed outside the main body of the image forming apparatus 200, the loosening operation is performed while the developing device 100 is held in a vertical attitude in which the drive input portion 141 is directed upward as illustrated in FIG. 11, which makes it possible to loosen the developer by using drive of the loosening member 140 and the gravity. Accordingly, it is possible to loosen the developer in a hardened state (tapping state). As described above, the overload by the developer during the initial operation of the developing device 100 occurs, in particular, in the case where the developer is positioned on the downstream side in the conveyance direction T by the agitation screw 104*b* in the agitation chamber 101*b* in which the developer is sealed. Accordingly, in a case where it is assumed that the developer is loosened while the developing device 100 is in the vertical attitude, providing the operation portion 143 at a downstream end part of the developing device 100 in the conveyance direction T by the agitation screw 104*b* as illustrated in FIG. 11 facilitates execution of the loosening operation utilizing the gravity. In the state where the developing device 100 is mounted on the image forming apparatus 200, the downstream end part in the conveyance direction T by the agitation screw 104*b* is located on the front side in a front-depth direction of the image forming apparatus 200. Accordingly, the worker can easily access the operation portion 143.

Figure 12:
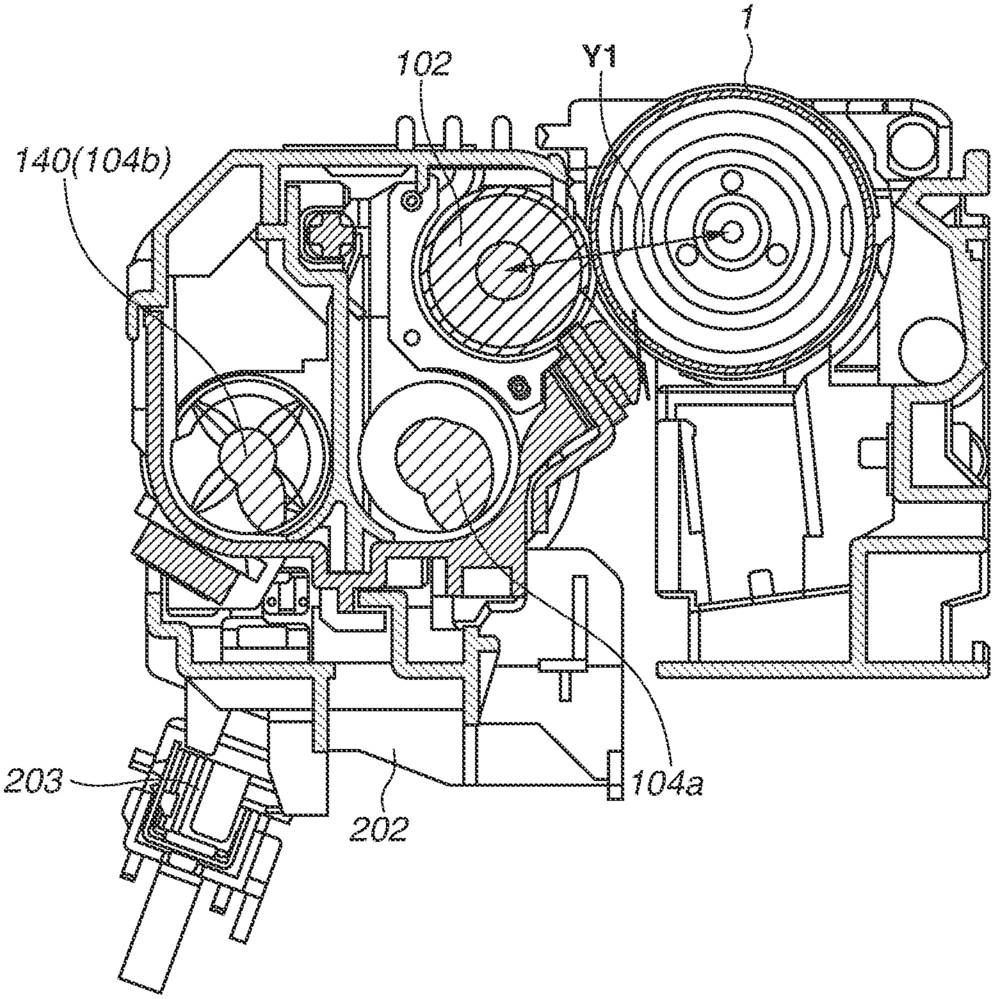
FIG. 12 is a diagram illustrating a cross-sectional configuration in a state where the developing device is pressurized according to the first exemplary embodiment.
Figure 13:
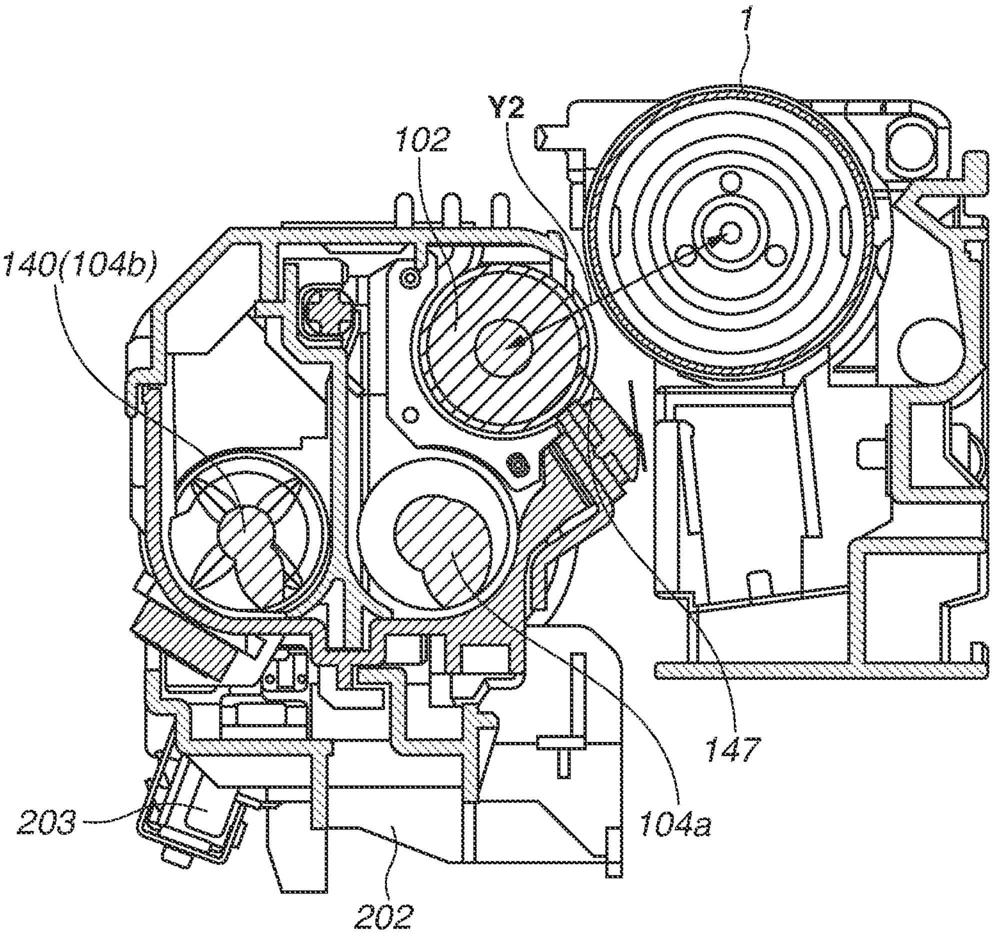
FIG. 13 is a diagram illustrating the cross-sectional configuration in a state where the developing device is separated according to the first exemplary embodiment.

Positional Relationship of Developing Device and Photosensitive Drum During Loosening Operation Positional relationship of the development sleeve 102 and the photosensitive drum 1 during the loosening operation of the developing device 100 is to be descried. FIG. 12 is a diagram illustrating a cross-sectional configuration in a state where the developing device 100 is pressurized. FIG. 13 is a diagram illustrating the cross-sectional configuration in a state where the developing device 100 is separated.

To develop the electrostatic image formed on the photosensitive drum 1 to form the toner image on the photosensitive drum 1, it is necessary for the developing device 100 to maintain a distance between a rotation center of the development sleeve 102 and a rotation center of the photosensitive drum 1 to a first distance Y1. Accordingly, in the first exemplary embodiment, the distance Y1 (first distance) is maintained by pressurizing the tray 202 on which the developing device 100 is mounted, by a pressurization member 203 (by putting developing device 100 into pressurized state).

For example, a case where the worker erroneously manually drives the drive input member 141 in a state where the developer is supplied and carried on the development sleeve 102 and the photosensitive drum 1 is stopped is to be considered. In such a case, the development sleeve 102 is also driven through the gears, and the photosensitive drum 1 may be damaged due to contact with the developer carried on the development sleeve 102. For this reason, as illustrated in FIG. 12, during the loosening operation of the developing device 100, even in the above-described case, it is necessary to maintain the distance between the rotation center of the development sleeve 102 and the rotation center of the photosensitive drum 1 to a second distance Y2 that is greater than the first distance Y1 and has no possibility of damaging the photosensitive drum 1.

Figure 14:
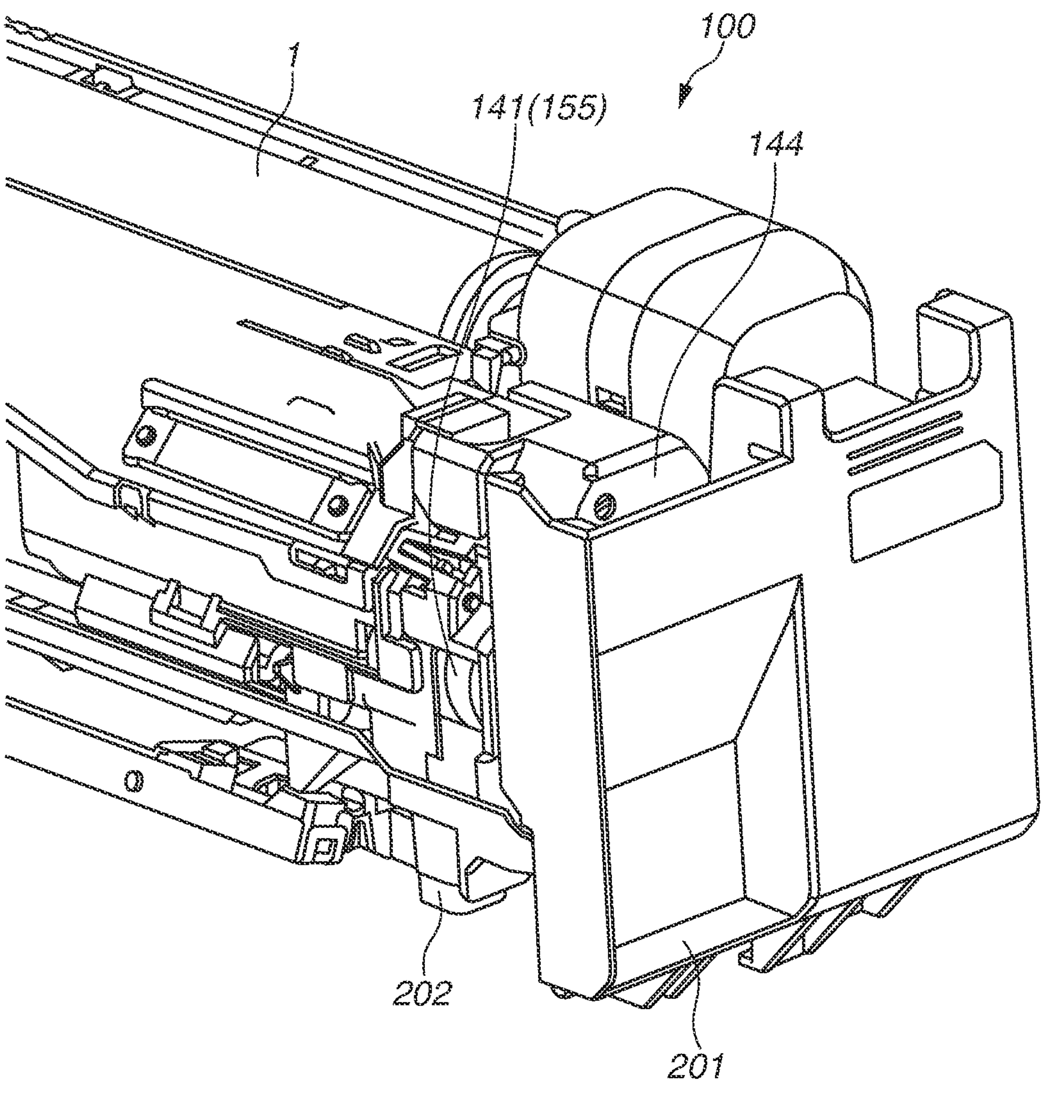
FIG. 14 is a diagram illustrating a configuration in a state where a small door is closed according to the first exemplary embodiment.
Figure 15:
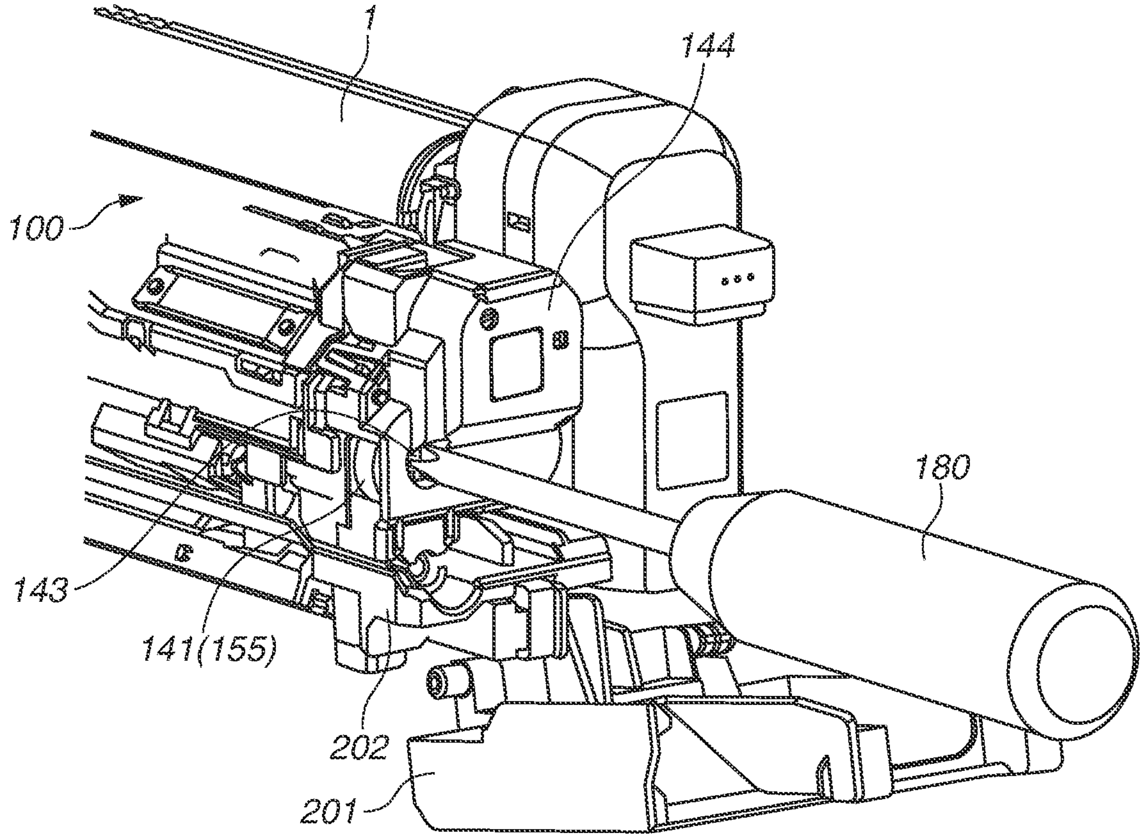
FIG. 15 is a diagram illustrating a configuration in a state where the small door is opened according to the first exemplary embodiment.

In the first exemplary embodiment, as illustrated in FIG. 14, in a state where the small door 201 is closed to prevent the drive input member 141 from being driven, the tray 202 is pressurized by the pressurization member 203 as illustrated in FIG. 12. In contrast, in a state where the small door 201 is opened to enable driving of the drive input member 141 as illustrated in FIG. 15, the tray 202 is transited to a non-pressurized state as illustrated in FIG. 13. The configuration in which the developing device 100 is separated such that the distance between the rotation center of the development sleeve 102 and the rotation center of the photosensitive drum 1 becomes the second distance Y2 is realized.

Figure 16:
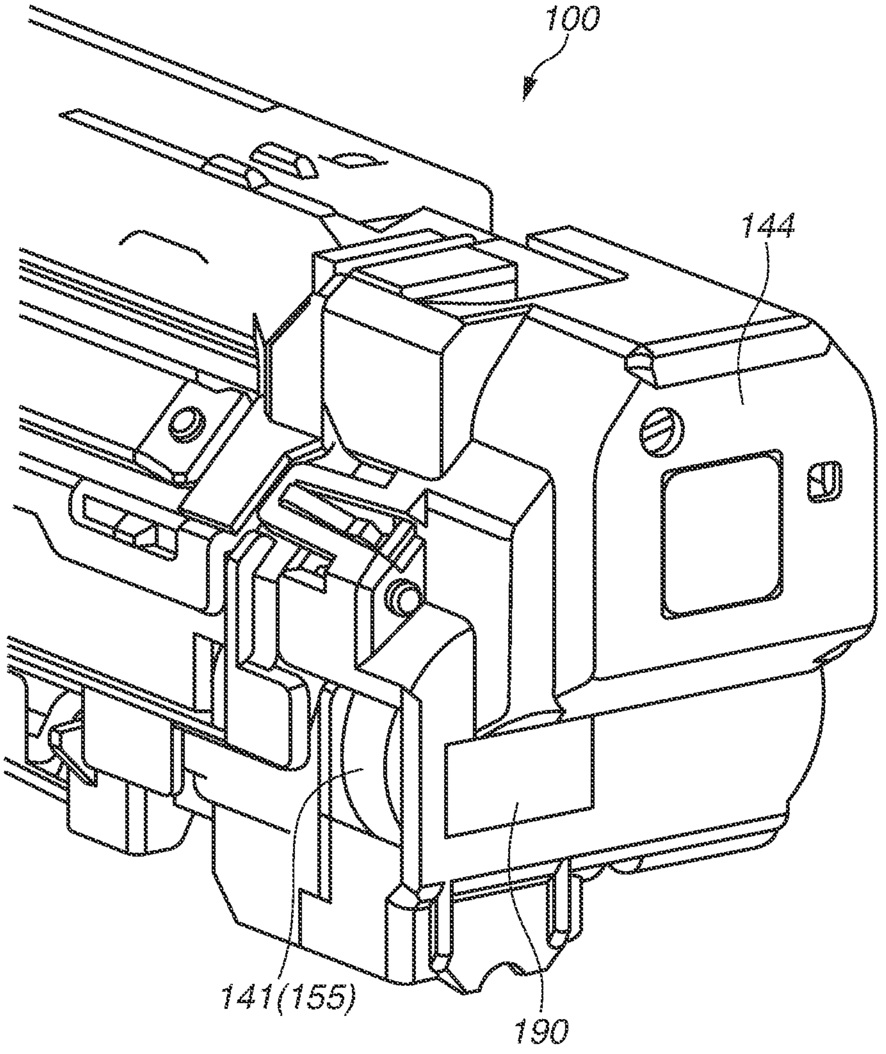
FIG. 16 is a diagram illustrating erroneous operation prevention by a detachable member according to the first exemplary embodiment.

Even in the state where the small door 201 is opened, if the development sleeve 102 is reversely rotated by drive from the outside while the developer is carried on the development sleeve 102, the developer is scraped and accumulated on a sheet 147 provided for preventing the developer from being scattered in FIG. 13, and the toner may be scattered. Accordingly, to enable execution of the loosening operation of the developing device 100 only in the state where the developing device 100 is separated before the sealing is unsealed, a detachable member that prevents driving of the drive input member by external force in the state where the developing device 100 is mounted on the image forming apparatus 200 is provided in the developing device 100. Accordingly, the worker can perform the loosening operation for the first time by detaching the detachable member in the loosening operation of the developing device 100. This makes it possible to prevent the worker from erroneously performing the loosening operation after the sealing is unsealed. In the first exemplary embodiment, a seal 190 is stuck to the cover 144 as illustrated in FIG. 16 to realize erroneous operation prevention by the detachable member.

Another exemplary embodiment (second exemplary embodiment) of the present disclosure is to be described. A basic configuration is the same as the configuration according to the first exemplary embodiment. Accordingly, elements having functions and configurations substantially identical or corresponding to the elements according to the first exemplary embodiment are denoted by the same reference numerals, and detailed description of the elements is omitted. Only configuration portions unique to the second exemplary embodiment are to be described in detail.

Figure 17:
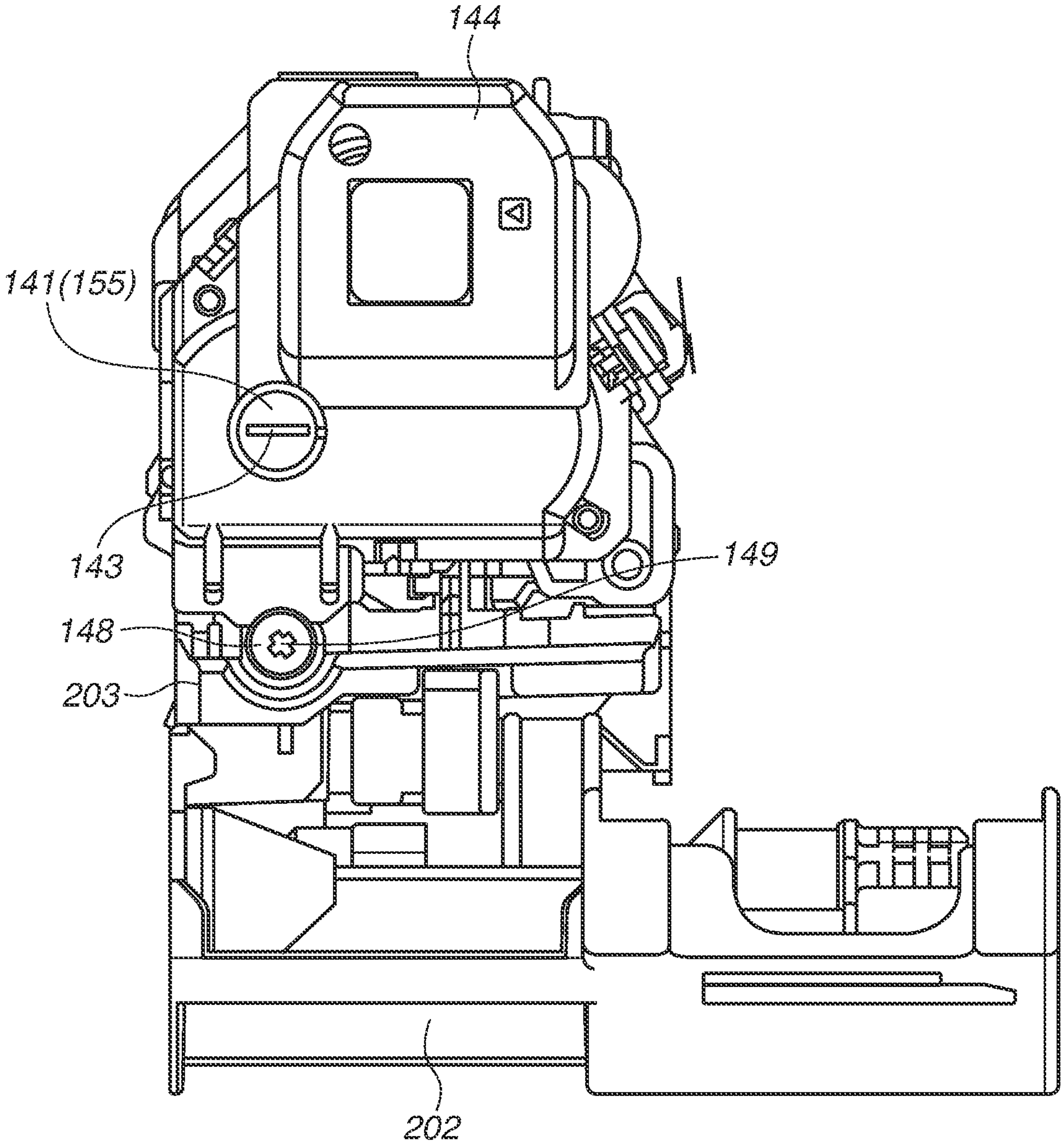
FIG. 17 is a diagram illustrating a configuration in a state where a small door is opened according to a second exemplary embodiment.

A configuration in the state where the small door 201 is opened according to the second exemplary embodiment is to be described with reference to FIG. 17 that is a front view when the small door 201 is opened. The configurations of the developing device 100 and the mechanism for sealing and unsealing are the same as the configurations according to the first exemplary embodiment. Accordingly, description of the configurations is omitted. To mount the developing device 100 on the tray 202 inside the image forming apparatus 200, a cross-slot screw is used as a fastening member 148 for fixation. The screw is manually fastened using a screwdriver. For this reason, in a case where the shape of the operation portion 143 of the drive input member 141 is the same cross slot, the worker may erroneously drive the drive input member 141. If the worker erroneously drives the drive input member 141, toner may be scattered along with reverse rotation of the development sleeve 102 as described in the first exemplary embodiment.

Thus, in the second exemplary embodiment, the operation portion 143 is formed not in the cross slot but in a rectangular groove that is different from the shape of a fastening operation portion 149 of the fastening member 148. Accordingly, the operation portion 143 can be driven only by a flathead screwdriver.

Still another exemplary embodiment (third exemplary embodiment) of the present disclosure is to be described. A basic configuration is the same as the configuration according to the first exemplary embodiment. Accordingly, elements having functions and configurations substantially identical or corresponding to the elements according to the first exemplary embodiment are denoted by the same reference numerals, and detailed description of the elements is omitted. Only configuration portions unique to the third exemplary embodiment are to be described in detail.

Figure 18:
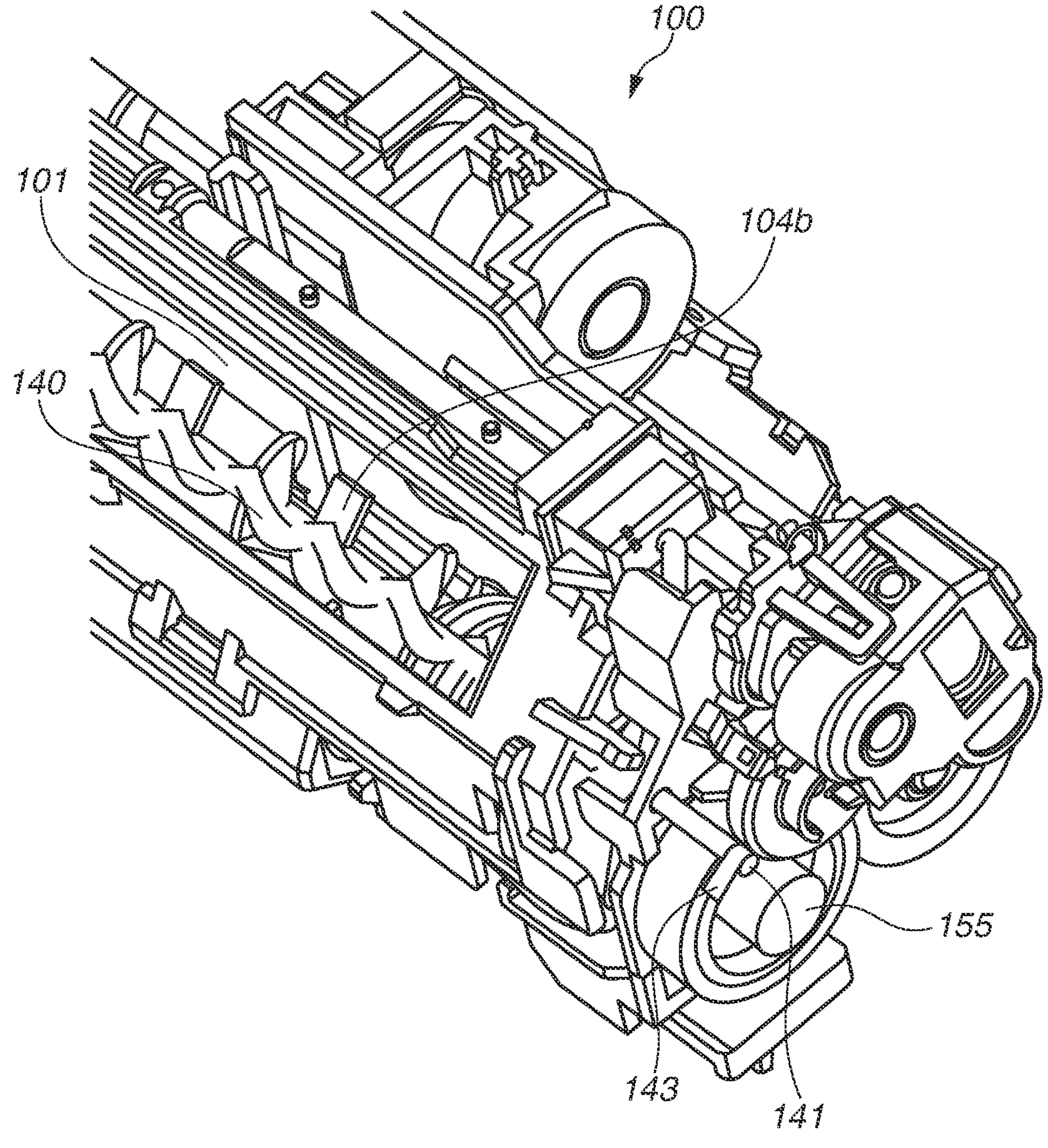
FIG. 18 is a diagram illustrating loosening operation of a developing device according to a third exemplary embodiment.

FIG. 18 is a diagram illustrating loosening operation of the developing device 100 according to the third exemplary embodiment. The configurations of the developing device 100 and the mechanism for sealing and unsealing are the same as the configurations according to the first exemplary embodiment. Accordingly, description of the configurations is omitted. In the third exemplary embodiment, the loosening member 140 may be a member different from the agitation screw 104*b*. As described above in the first exemplary embodiment, the overload often occurs in the case where the developer is positioned on the downstream side in the conveyance direction by the agitation screw 104*b*. Accordingly, the loosening member 140 is preferably provided on the downstream side in the conveyance direction by the agitation screw 104*b* so as not to inhibit circulation of the developer.

Driving of the drive input member 141 by the operation portion 143 and the external force can be performed not only by drive with the tool 180 as in the first exemplary embodiment but also by pulling a seal member wound around the loosening member 140 as illustrated in FIG. 18. When the seal member is pulled out, the loosening member 140 is driven to release the compaction state of the developer inside the developing device 100. When the seal member is entirely pulled out, end of the loosening operation of the developing device 100 can be grasped in a quantitative manner.

The present disclosure is not limited to the above-described exemplary embodiments. Various modifications (including organic combinations of exemplary embodiments) can be made based on the gist of the present disclosure, and are not excluded from the scope of the present disclosure.

In the above-described exemplary embodiments, the image forming apparatus 200 using the intermediate transfer belt 7 as illustrated in FIG. 1 is described as an example, but the configuration is not limited to the example. The present disclosure can be applied to an image forming apparatus having a configuration in which transfer is performed by sequentially bringing recording media P into direct contact with the photosensitive drum 1.

In the state where the developing device is mounted on the image forming apparatus, the tapping state of the developing device can be manually eliminated.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-154394, filed Sep. 28, 2022, which is hereby incorporated by reference herein in its entirety.

What is claimed is:

1. A developing device comprising:

a developer carrier configured to carry developer containing toner and carrier for developing an electrostatic image formed on an image carrier;

a first chamber configured to supply the developer to the developer carrier;

a second chamber partitioned from the first chamber by a partition and configured to allow circulation of the developer between the second chamber and the first chamber;

a first communication portion configured to permit the developer to communicate from the second chamber to the first chamber;

a second communication portion configured to permit the developer to communicate from the first chamber to the second chamber;

a first conveyance screw disposed in the first chamber and configured to convey the developer in a first direction from the first communication portion toward the second communication portion;

a second conveyance screw disposed in the second chamber and configured to convey the developer in a second direction from the second communication portion toward the first communication portion;

a pair of sealing members configured to seal the first communication portion and the second communication portion to store initial developer in the second chamber; and a drive transmission gear configured to transmit driving force for rotating the second conveyance screw to the second conveyance screw, wherein the drive transmission gear includes a fitting portion to which a tool to input the driving force for rotating the second conveyance screw to the drive transmission gear is fitted.

2. The developing device according to claim 1, wherein the driving force for rotating the second conveyance screw is inputtable to the drive transmission gear through the fitting portion in a state where the first communication portion and the second communication portion are sealed by the pair of sealing members.

3. The developing device according to claim 1, wherein the second conveyance screw is rotatable in a first rotation direction when the driving force for rotating the second conveyance screw in the first rotation direction is input to the drive transmission gear through the fitting portion, and wherein the second conveyance screw is rotatable in a second rotation direction when the driving force for rotating the second conveyance screw in the second rotation direction opposite to the first rotation direction is input to the drive transmission gear through the fitting portion.

4. The developing device according to claim 1, wherein the drive transmission gear is provided on a rotary shaft of the second conveyance screw.

5. The developing device according to claim 4, further comprising a gear cover configured to cover the drive transmission gear in a rotary shaft direction of the second conveyance screw, wherein the fitting portion is exposed through an opening of the gear cover in the rotary shaft direction of the second conveyance screw.

6. The developing device according to claim 1, wherein the drive transmission gear is disposed on a downstream side of the first communication portion in the second direction.

7. The developing device according to claim 1, wherein the tool is a Phillips-head screwdriver, and wherein the fitting portion is a groove to which the Phillips-head screwdriver is fitted.

8. The developing device according to claim 1, wherein the tool is a flathead screwdriver, and wherein the fitting portion is a groove to which the flathead screwdriver is fitted.

9. The developing device according to claim 1, further comprising an unsealing mechanism configured to unseal each of the first communication portion and the second communication portion sealed by the pair of sealing members, by using driving force supplied from a driving source.

10. The developing device according to claim 9, wherein the unsealing mechanism includes a winding shaft that is rotatable and is configured to wind up the pair of sealing members, and wherein the winding shaft is rotationally driven in a winding direction by the driving force supplied from the driving source, and the pair of sealing members are wound around the winding shaft rotationally driven in the winding direction to unseal the first communication portion and the second communication portion sealed by the pair of sealing members.

11. A method of agitating initial developer inside a developing device, wherein the developing device includes a developer carrier configured to carry developer containing toner and carrier for developing an electrostatic image formed on an image carrier, a first chamber configured to supply the developer to the developer carrier, a second chamber partitioned from the first chamber by a partition and configured to allow circulation of the developer between the second chamber and the first chamber, a first communication portion configured to permit the developer to communicate from the second chamber to the first chamber, a second communication portion configured to permit the developer to communicate from the first chamber to the second chamber, a first conveyance screw disposed in the first chamber and configured to convey the developer in a first direction from the first communication portion toward the second communication portion, a second conveyance screw disposed in the second chamber and configured to convey the developer in a second direction from the second communication portion toward the first communication portion, a pair of sealing members configured to seal the first communication portion and the second communication portion to store initial developer in the second chamber, and a drive transmission gear configured to transmit driving force for rotating the second conveyance screw to the second conveyance screw, the method comprising:

inputting the driving force for rotating the second conveyance screw to the drive transmission gear by using a tool in a state where the first communication portion and the second communication portion are sealed by the pair of sealing members; and agitating the initial developer by rotation of the second conveyance screw by inputting the driving force for rotating the second conveyance screw to the drive transmission gear.

12. The method according to claim 11, wherein the driving force for rotating the second conveyance screw in a first rotation direction is input to the drive transmission gear by using the tool, and the driving force for rotating the second conveyance screw in a second rotation direction opposite to the first rotation direction is input to the drive transmission gear by using the tool, and wherein the second conveyance screw rotates in the first rotation direction to agitate the initial developer when the driving force for rotating the second conveyance screw in the first rotation direction is input to the drive transmission gear, and the second conveyance screw rotates in the second rotation direction to agitate the initial developer when the driving force for rotating the second conveyance screw in the second rotation direction is input to the drive transmission gear.

13. The method according to claim 11, wherein the driving force for rotating the second conveyance screw is input to the drive transmission gear by using the tool while the drive transmission gear of the developing device is directed upward in a gravity direction.

14. The method according to claim 11, wherein the driving force for rotating the second conveyance screw is input to the drive transmission gear by using the tool in a state where the developing device is not mounted on an image forming apparatus.

15. The method according to claim 11, wherein the driving force for rotating the second conveyance screw is input to the drive transmission gear by using the tool in a state where the developing device is mounted on an image forming apparatus.

16. The method according to claim 11, wherein the drive transmission gear is provided on a rotary shaft of the second conveyance screw.

17. The method according to claim 16, wherein the developing device further includes a gear cover configured to cover the drive transmission gear in a rotary shaft direction of the second conveyance screw, and wherein a fitting portion is exposed through an opening of the gear cover in the rotary shaft direction of the second conveyance screw.

18. The method according to claim 11, wherein the drive transmission gear is disposed on a downstream side of the first communication portion in the second direction.

19. The method according to claim 11, wherein the tool is a Phillips-head screwdriver.

20. The method according to claim 11, wherein the tool is a flathead screwdriver.

* * * * *